(12) United States Patent
Wagner et al.

(10) Patent No.: US 7,386,279 B2
(45) Date of Patent: Jun. 10, 2008

(54) CONTEXT BASED MAIN SCREEN FOR MOBILE DEVICE

(75) Inventors: Annette M. Wagner, Los Altos, CA (US); Daniel R. Coward, San Francisco, CA (US); Dana H. Myers, Fairfield, CA (US); Jon Bostrom, Reno, NV (US)

(73) Assignee: Sun Microsystems, Inc., Santa Clara, CA (US)

( * ) Notice: Subject to any disclaimer, the term of this patent is extended or adjusted under 35 U.S.C. 154(b) by 384 days.

(21) Appl. No.: 10/808,824

(22) Filed: Mar. 24, 2004

(65) Prior Publication Data

US 2004/0259598 A1 Dec. 23, 2004

Related U.S. Application Data

(60) Provisional application No. 60/460,052, filed on Apr. 2, 2003.

(51) Int. Cl.
*H04M 1/00* (2006.01)
(52) U.S. Cl. .................. 455/73; 455/556.2; 455/566
(58) Field of Classification Search ............ 455/556.1, 455/556.2, 566, 414.1, 414.2, 414.3; 715/708, 715/734, 740, 744
See application file for complete search history.

(56) References Cited

U.S. PATENT DOCUMENTS

| | | | | |
|---|---|---|---|---|
| 5,365,360 | A * | 11/1994 | Torres ........................ | 715/802 |
| 6,084,951 | A * | 7/2000 | Smith et al. .............. | 379/93.17 |
| 6,091,956 | A * | 7/2000 | Hollenberg .............. | 455/456.5 |
| 6,249,815 | B1 | 6/2001 | Foladare et al. | |
| 6,282,435 | B1 * | 8/2001 | Wagner et al. ............ | 455/566 |
| 6,342,894 | B1 * | 1/2002 | Nojiri ........................ | 345/531 |
| 6,501,956 | B1 * | 12/2002 | Weeren et al. ............ | 455/463 |
| 6,668,177 | B2 * | 12/2003 | Salmimaa et al. ......... | 455/566 |
| 6,757,372 | B1 * | 6/2004 | Dunlap et al. ............ | 379/142.17 |
| 6,842,877 | B2 * | 1/2005 | Robarts et al. ............ | 715/708 |
| 7,047,041 | B2 * | 5/2006 | Vanska et al. ............ | 455/558 |
| 7,197,570 | B2 * | 3/2007 | Eylon et al. ............... | 709/231 |
| 2002/0111172 | A1 | 8/2002 | DeWolf et al. | |
| 2002/0133545 | A1 * | 9/2002 | Fano et al. ................ | 709/203 |

(Continued)

FOREIGN PATENT DOCUMENTS

EP 0 888 025 A2 12/1998

(Continued)

*Primary Examiner*—Simon Nguyen
(74) *Attorney, Agent, or Firm*—Martine Penilla & Gencarella, LLP (57) ABSTRACT

An invention is provided for a context based mobile device display. The context based mobile device display includes a primary service icon representing a service most likely to be utilized by a user within a predefined period of time based on user profile information. The primary service icon is displayed in a primary position on the mobile device display. Also included is a plurality of secondary service icons representing services likely to be utilized by a user within a predefined period of time, however not as likely as the primary service, based on user profile information. The secondary service icons are smaller than the service icon representing the service in the primary position. A plurality of tertiary service icons representing remaining services available to the user are further included in the context based mobile device display. The tertiary service icons are displayed in a tertiary position of the mobile device display.

18 Claims, 8 Drawing Sheets

U.S. PATENT DOCUMENTS

| | | |
|---|---|---|
| 2002/0187775 A1 | 12/2002 | Corrigan et al. |
| 2002/0198991 A1* | 12/2002 | Gopalakrishnan et al. .. 709/225 |
| 2003/0013483 A1* | 1/2003 | Ausems et al. ............. 455/556 |
| 2003/0064757 A1* | 4/2003 | Yamadera et al. .......... 455/566 |
| 2003/0187984 A1 | 10/2003 | Banavar et al. |
| 2004/0013246 A1* | 1/2004 | Back et al. .............. 379/88.17 |
| 2004/0043758 A1* | 3/2004 | Sorvari et al. ........... 455/414.1 |
| 2004/0075675 A1 | 4/2004 | Ravisto et al. |
| 2004/0198360 A1* | 10/2004 | Kotzin ...................... 455/445 |
| 2004/0225654 A1 | 11/2004 | Banavar et al. |
| 2004/0243257 A1* | 12/2004 | Theimer ...................... 700/44 |
| 2005/0009571 A1* | 1/2005 | Chiam et al. ............... 455/566 |
| 2005/0060365 A1 | 3/2005 | Robinson et al. |
| 2005/0108322 A1* | 5/2005 | Kline et al. ................. 709/203 |
| 2005/0132006 A1* | 6/2005 | Horvitz et al. .............. 709/204 |
| 2005/0204030 A1* | 9/2005 | Koch et al. ................. 709/223 |
| 2007/0061735 A1* | 3/2007 | Hoffberg et al. ............ 715/744 |

FOREIGN PATENT DOCUMENTS

GB     2 346 716 A     8/2000

* cited by examiner

CONTEXT BASED MAIN SCREEN FOR MOBILE DEVICE

CROSS REFERENCE TO RELATED APPLICATIONS

This application claims priority to U.S. Patent Application No. 60/460,052, entitled "Context Based Main Screen For Mobile Device," filed Apr. 2, 2003, which is incorporated herein by reference. This application is also related to U.S. patent application Ser. No. 10/808,761, filed on the same date as the instant application, and is incorporated herein by reference.

BACKGROUND OF THE INVENTION

1. Field of the Invention

This invention relates generally to mobile devices, and more particularly to systems and methods for advanced service interactions on mobile devices.

2. Description of the Related Art

Figure 1:
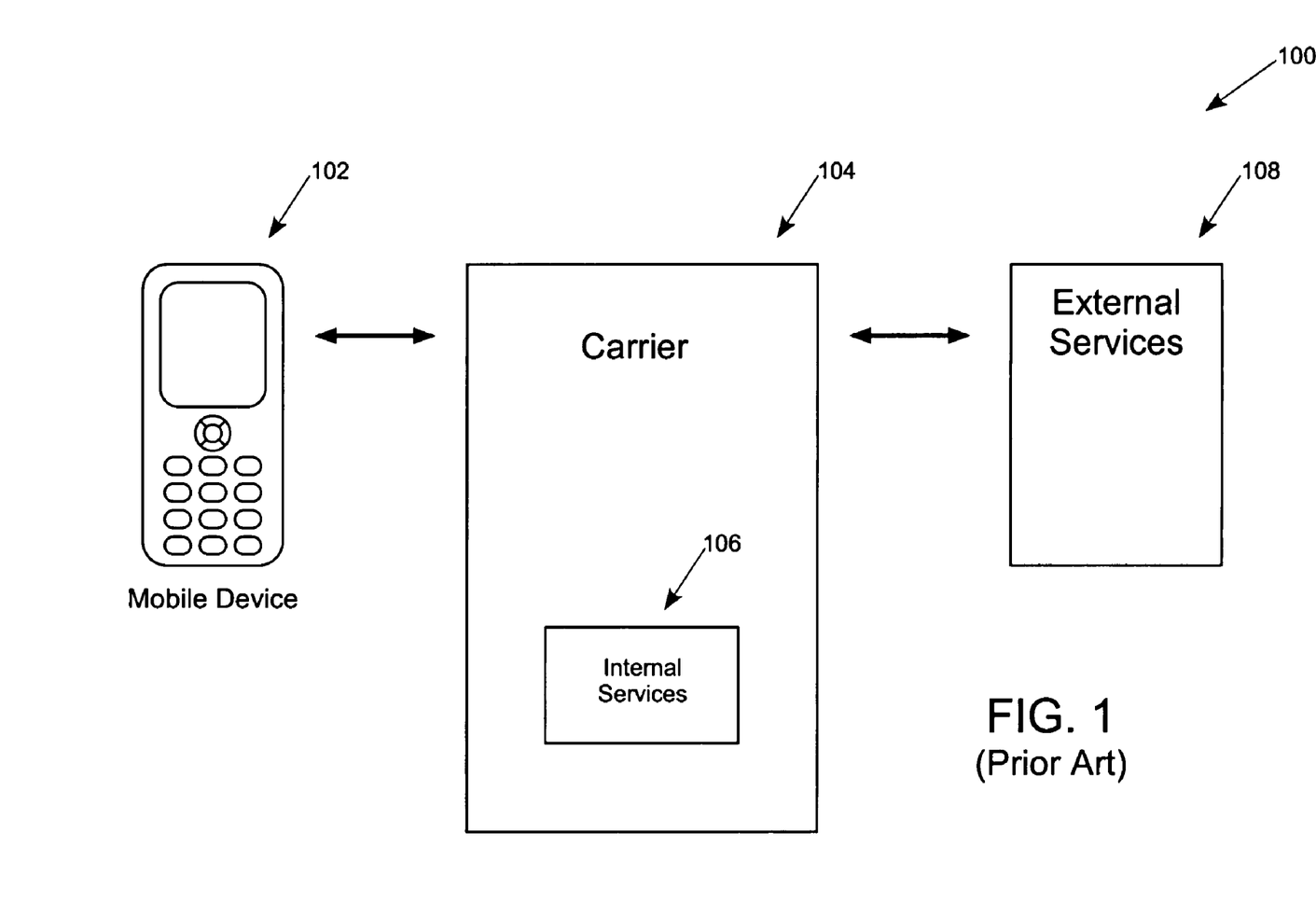
FIG. 1 is a block diagram of an exemplary cellular telephone system.

Although, cellular telephone systems have traditionally been utilized to provide voice data communication, additional data services, such as Internet access and scheduling, are being made increasingly available to mobile device subscribers. For example, FIG. 1 is a block diagram of an exemplary cellular telephone system 100. The cellular telephone system 100 includes a mobile device 102, such as a cellular phone, which is in communication with a carrier network 104. The carrier network 104 supplies the network and other elements to enable the mobile device 102 to interact with the internal services 106 and external services 108 available via the carrier system 104.

For example, the carrier network 104 typically can include a number of fixed base station transceivers, which mobile devices 102 communicate with via radio channels. However, the number of radio channels that the operator is permitted to use is limited, and there generally is not enough for each mobile device 102 in the network to be carried on a different channel. Thus, the carrier network 104 reuses channels, that is, at any time many base stations may be transceiving on each channel. The coverage area of each radio base station is often referred to as a "cell."

As mentioned above, in addition to voice services, data services are being made increasingly available to mobile device subscribers. Thus, in addition to voice data services, such as voice mail, telephone call back, and three way calling, carrier networks 104 are beginning to provide additional electronic data to users in various ways. Exemplary data services can include calendaring facilities, book buying services, Internet browsing, and text messaging. As mobile devices 102 become more sophisticated, the mobile devices 102 can execute software applications, which can be front ends for data services.

As illustrated in FIG. 1, the carrier network 104 may provide internal services 106, which are data services provided directly from the carrier network 104. For example, internal services can include calendaring facilities, instant messaging, and other services that the carrier network 104 provider is capable of providing to subscribers. To provide additional data services, the carrier network 104 can partner with third party providers of external services 108. Each external service 108 actually runs the service, and the carrier network 104 facilitates usage of the service to its subscribers by provisioning the service throughout the carrier network 104. In this manner, subscribers can interact with the external services 108 using their mobile devices 102, such as their cellular telephones.

Often Carrier Networks 104 are proficient at providing particular classes of data services, such as scheduling and instant messaging. For other services, the carrier network 104 relies on the external service providers 108. These external service providers 108 generally provide services to the carrier network 104, which can charge subscribers more for the services. The carrier network provider 104 is then charged, in turn, by the external service providers 108. These external services then appear as part of the carrier network services to the subscriber.

Unfortunately, full utilization of data services has not occurred, most notably because of the difficulty many users experience in using data services on a mobile device and a lack of data service management capabilities of carrier networks. For example, many high end cellular phones include an Internet browser. However, the startup time for the browser often is long. In addition, from the point of view of the user, the user is required to do a very technical operation in starting up the browser, going to a bookmark or remembering a URL, and typing all the required information into the phone. If the user is lucky, a text messaging service may be available through their carrier network. However, to use such a service, the user generally is required to close down the browser, navigate the various menus to find the messaging icon, and select the icon to begin the text messaging service. In addition, multiple external services often are difficult for a carrier network service. That is, carrier networks often experience difficulties in managing the various service relationships between services provided by the external service providers. So aggregating the services that user will ultimately see on their mobile device is difficult for carrier networks to manage.

Thus, a major inhibitor to data service utilization is the lack of a seamless, intuitive, easy user experience with data service usage on the mobile device. That is, a user is required to have a relatively in depth technical knowledge of the phone and carrier capabilities to utilize the data services. For example, to utilize an external book purchasing service, the user is required to know that they must startup the Internet browser, select the appropriate URL, and navigate to the appropriate purchase section of the related web site.

In view of the foregoing, there is a need for techniques that provide a seamless, intuitive, easy user experience with data services on mobile devices. The techniques should not require in depth technical knowledge on the part of the user. In addition, the techniques should facilitate service aggregation and management for carrier network providers.

SUMMARY OF THE INVENTION

Broadly speaking, embodiments of the present invention address these needs by providing systems and methods that integrate systems and software to manage and integrate a plurality of data services to users of mobile devices. In this manner, embodiments of the present invention provide a seamless, intuitive, and easy user experience with data services on mobile devices. In one embodiment, a method for providing context based information on a mobile device display is disclosed. The method includes predicting a set of services from a plurality of services that a user is expected to utilize within a predefined period of time based on user profile information. A service icon representing a service of the set of services most likely to be utilized is displayed in a primary position on the mobile device display. In addition, service icons representing remaining services in the set of services are displayed in secondary positions on the mobile device display. To enhance usability, the service icons representing the remaining services in the secondary positions are smaller than the service icon representing the service in the primary position. Optionally, icons representing remaining services outside the set of services, that generally are infrequently used, can be displayed in a tertiary position of the mobile device display. In one aspect, the tertiary positions can be within a tertiary tray that can be hidden during normal operation.

In an additional embodiment, a context based mobile device display is disclosed. The context based mobile device display includes a primary service icon representing a service most likely to be utilized by a user within a predefined period of time based on user profile and context aware information. The primary service icon is displayed in a primary position on the mobile device display. Also included is a plurality of secondary service icons representing services likely to be utilized by a user within a predefined period of time, however not as likely as the primary service, based on user profile information and user context information. The secondary service icons are smaller than the service icon representing the service in the primary position. A plurality of tertiary service icons representing remaining services available to the user are further included in the context based mobile device display. The tertiary service icons are displayed in a tertiary position of the mobile device display. As above, the tertiary positions can be within a tertiary tray that can be hidden during normal operation. In addition, a ticker tape display can be included that presents data in a scrolling manner on the mobile device display. In one aspect, each primary service icon and secondary service icon can be labeled utilizing informational icon labels. In this case, each information icon label presents specific information regarding a state of a corresponding service as it applies to the user. Further, each informational icon labels can change when the state of the corresponding service changes. Similarly, each service icon can be animated based on the state of the corresponding service as it applies to the user.

A computer program embodied on a computer readable medium for providing context based information on a mobile device display is disclosed in a further embodiment of the present invention. The computer program includes program instructions that predict a set of services from a plurality of services that a user is expected to utilize within a predefined period of time based on user profile information. In addition, program instructions are included that display a service icon representing a service of the set of services most likely to be utilized in a primary position on the mobile device display. Further, program instructions are included that display service icons representing remaining services in the set of services in secondary positions on the mobile device display. As above, the service icons representing remaining services displayed in the secondary positions are smaller than the service icon representing the service in the primary position. Optionally, program instructions can be included that display icons representing remaining services outside the set of services in a tertiary position of the mobile device display, for example, the tertiary position can be within a tertiary tray that can be hidden during normal operation. Other aspects and advantages of the invention will become apparent from the following detailed description, taken in conjunction with the accompanying drawings, illustrating by way of example the principles of the invention.

BRIEF DESCRIPTION OF THE DRAWINGS

The invention, together with further advantages thereof, may best be understood by reference to the following description taken in conjunction with the accompanying drawings in which.

DETAILED DESCRIPTION OF THE PREFERRED EMBODIMENTS

An invention is disclosed for a context based main screen for a mobile device. Embodiments of the present invention integrate systems and software to manage and integrate a plurality of data services for context based display on a mobile device. In the following description, numerous specific details are set forth in order to provide a thorough understanding of the present invention. It will be apparent, however, to one skilled in the art that the present invention may be practiced without some or all of these specific details. In other instances, well known process steps have not been described in detail in order not to unnecessarily obscure the present invention.

Figure 2:
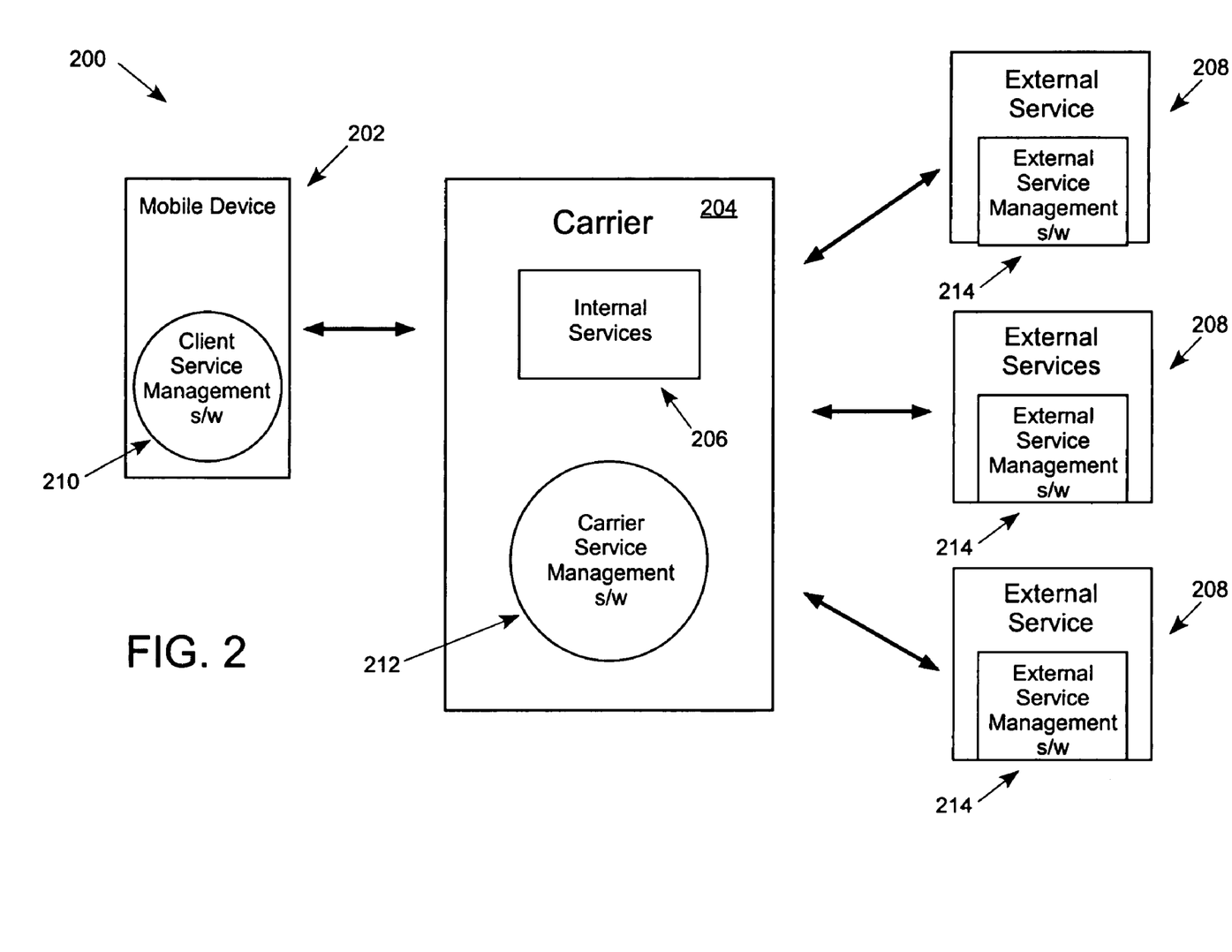
FIG. 2 is a block diagram showing a cellular telephone system having advanced service interaction, in accordance with an embodiment of the present invention.

FIG. 1 was described in terms of the prior art. FIG. 2 is a block diagram showing a cellular telephone system 200 having advanced service interaction, in accordance with an embodiment of the present invention. The cellular telephone system 200 includes a mobile device 202, such as a cellular phone, which is in communication with a carrier network provider 204. The carrier network provider 204 supplies the network and other elements to enable the mobile device 202 to interact with the internal services 206 and external services 208 available via the carrier network provider 204.

For example, as described above, the carrier network provider 204 typically can include a number of fixed base station transceivers, with which mobile devices 202 communicate via radio channels. However, the number of radio channels that the operator is permitted to use is limited, and there generally is not enough for each mobile device 202 in the network to be carried on a different channel. Thus, the carrier network 204 reuses channels, that is, at any time many base stations may be transceiving on each channel. The coverage area of each radio base station is often referred to as a "cell."

Embodiments of the present invention manage and integrate services using service management software spread across the components of the system 200. In one embodiment, the service management software includes client service management software 210 installed on the mobile devices 202 of the system, and carrier service management software 212 located within the carrier network 204. In addition, the service management software can include external service management software 214, which is located at the external service providers 208. Although FIG. 2 illustrates the service management software allocated between the mobile devices 202, carrier network 204, and external services 208, it should be noted that the embodiments of the present invention can be embodied on any one or two elements of the system 200.

The service management software of the embodiments of the present invention provide a seamless, intuitive, and easier user experience when interceding with data services through mobile devices 202. As will be explained in greater detail below, embodiments of the present invention provide data services to users based on user specific information, including user context information. Broadly speaking, the carrier provider 204 stores profile information regarding individual subscribers. In addition the carrier provider stores information regarding each individual subscriber's service usage patterns, such as, what services the individual uses, when they use each service, and how often each service is utilized. Basically, the carrier is gathering this information based on previous interactions with the service. Based on the above user information and stored descriptions of the data services available on the system 202, embodiments of the present invention display data services to subscribers in a manner that the subscriber is most likely to utilize the data services. Furthermore, as will be described in greater detail below, embodiments of the present invention recognize usage patterns and data convergence to further enhance the users experience.

Figure 3:
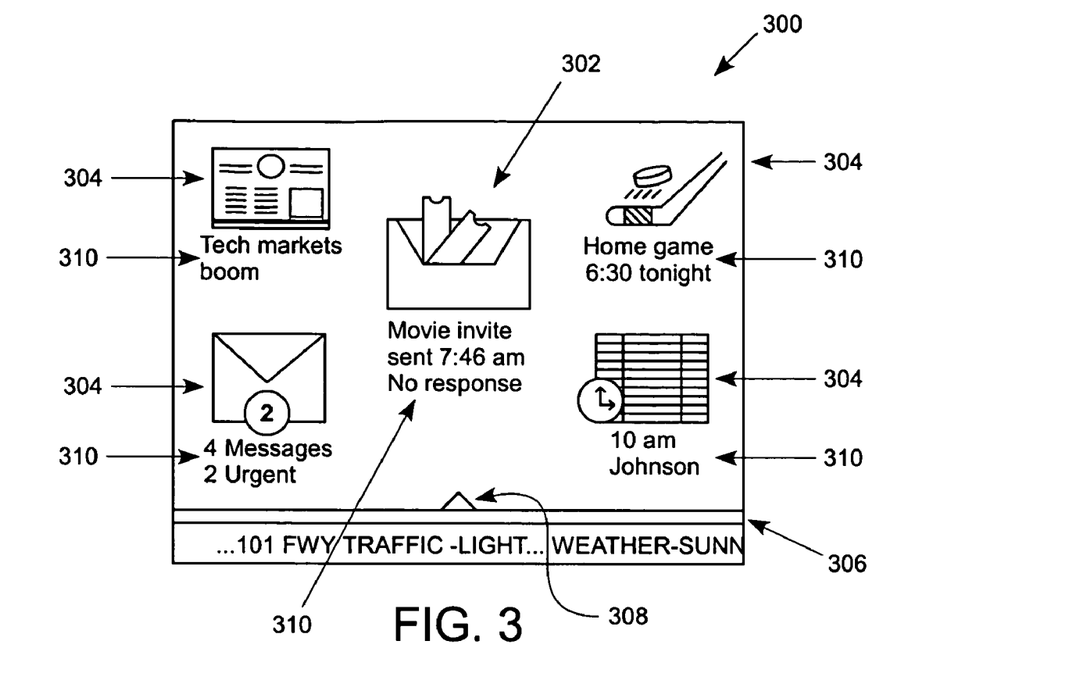
FIG. 3 is an illustration showing an exemplary context based display for a mobile device, in accordance with an embodiment of the present invention.

FIG. 3 is an illustration showing an exemplary context based display 300 for a mobile device, in accordance with an embodiment of the present invention. As will be described in greater detail below, the context based display 300 is generated utilizing context aware information. Hence, the information displayed on the context based display 300 is dependent on, for example, the time of day, location of the user, usage patterns, and preferences.

The context based display 300 presents services to subscribers utilizing service icons. In the example of FIG. 3, the service icons are displayed in various locations on the context based display 300 dependent on predicted usage. In particular, each service icon is presented in either a primary position 302, secondary position 304, or tertiary position 306. In the example of FIG. 3, the service icons located at the tertiary positions 306 are hidden within a tertiary tray accessed via a tertiary tab 308, however, it should be noted that the tertiary tray is only an example of tertiary icon placement. As such, service icons displayed in tertiary positions can be presented in any manner, such as on a side of the display, transparently, or in any other manner that conveys tertiary importance.

The service icon located at the primary position 302 represents the service which the service management software currently predicts the user is primarily interested in. In one embodiment, the service icon located at the primary position 302 generally is displayed using a larger icon than the service icons located in the secondary positions 304. In addition, the service icon located at the primary position 302 can be centrally located to further convey its importance. It should be noted, however, that the service icon at the primary position 302 can be presented to the user in any manner that conveys the predicted primary interest in the service.

The service icons in the secondary positions 304 represent services that the service management software predicts the user also is currently interested in, although less interested in as the service represented by the service icon in the primary position 302. Finally, service icons at the tertiary position 306 represent remaining services available to the particular subscriber. The secondary icons can also be presented to the user in a manner that conveys the predicted interest. In one example, the secondary service might be shown.

In addition to using positional data to assist the user in service selection, the service management software also provides informational icon labels 310. Each informational icon label 310 presents specific information regarding the state of that particular service as it applies to the particular subscriber. In other embodiments, it may not apply to the particular subscriber. For example, a service icon representing a news service may have an informational icon label displaying a current headline for the user. In the example of FIG. 3, the user has a preference for business news information. As such, the informational icon label 310 for the news service displays the business headline "Tech Markets Boom." Further, the text comprising each informational icon label 310 changes whenever the state of that particular service changes as it applies to the particular subscriber.

To further assist the user in service selection, embodiments of the present invention animate particular icons to indicate additional information regarding the particular service the icon represents. Thus, the animated icons are informational in nature. For example, a service icon representing the news service icon may initially be displayed as a "rolled up" newspaper. Then, to indicate new news has arrived, the news service icon may animate to display an "unrolled" newspaper. As another example, a mail service icon may display a counter that changes to indicate the number of unread messages a user has. As mentioned above, additional service icons are displayed in a tertiary position accessed via the tertiary tab 308, as described next with reference to FIG. 4.

Figure 4:
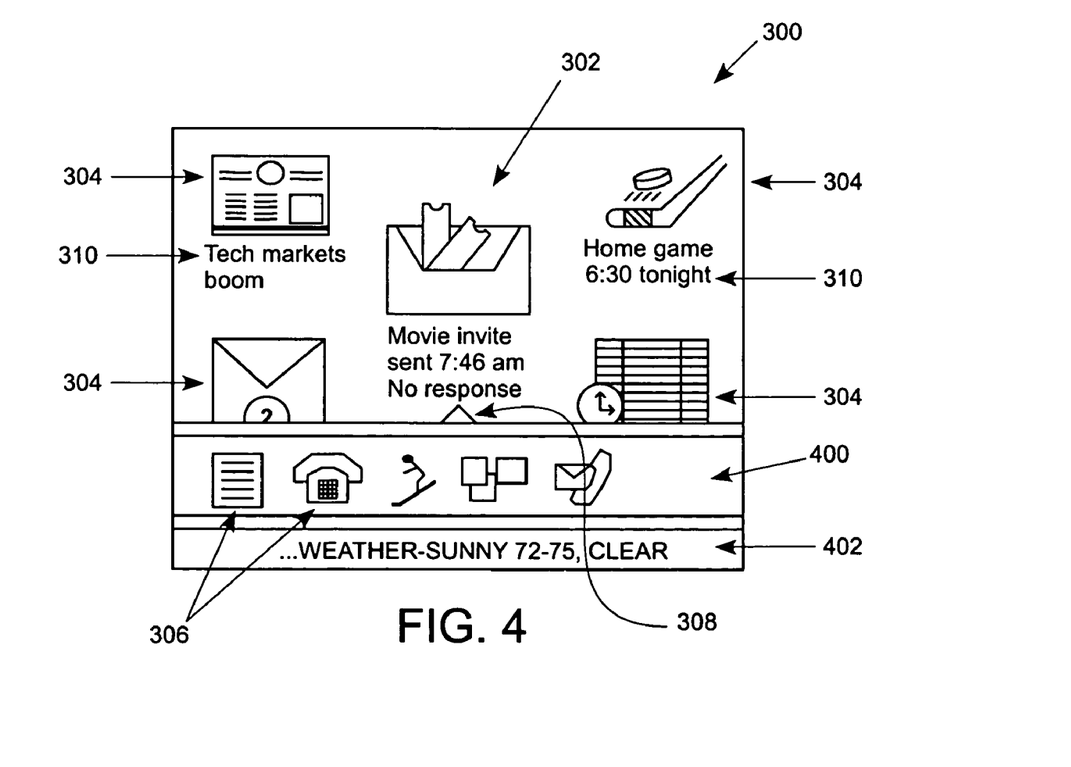
FIG. 4 is an illustration showing an exemplary context based display having tertiary service icons exhibited, in accordance with an embodiment of the present invention.

FIG. 4 is an illustration showing an exemplary context based display 300 having tertiary service icons exhibited, in accordance with an embodiment of the present invention. When the user selects the tertiary tab 308, a tertiary icon tray 400 is displayed revealing service icons in the tertiary positions 306. As mentioned above, service icons at the tertiary position 306 represent remaining services available to the particular subscriber, not already displayed in the primary 302 or secondary 304 positions. In another embodiment, all services can be listed in the tertiary position 306. These are services that the service management software predicts will not be utilized as soon or as often as the services represented by the service icons in the primary and secondary positions 302 and 304. In addition to the service icons, embodiments of the present invention can display additional information as scrolling text in a ticker tape display 402.

The ticker tape display 402 can present additional useful information, such as a weather report and stock quotes, based on the users current context. Similar to above, the information displayed in the ticker tape display 402 changes based on changes in the users current context. For example, a particular user may have the day's weather displayed in ticker tape display 402 in the morning, while current headlines may be displayed in the ticker tape display 402 in the afternoon.

As mentioned above, embodiments of the present invention provide data services and data service usage analysis to users based on user specific information. Broadly speaking, the carrier provider stores profile information regarding individual subscribers. In addition the carrier provider stores information regarding each individual subscriber's service usage patterns, such as, what services the individual uses, when they use each service, and how often each service is utilized.

Figure 5A:
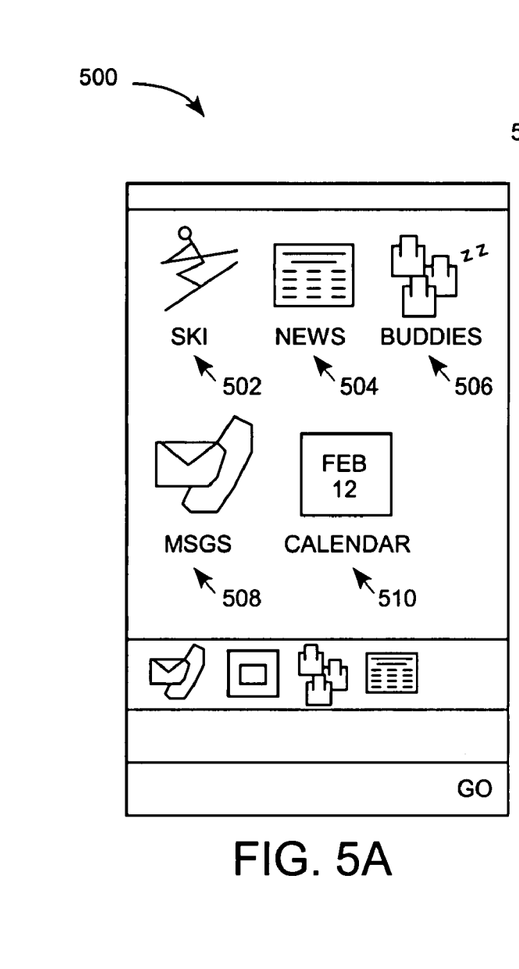
FIG. 5A illustrates an exemplary home page mobile device display for services managed via service management software, in accordance with an embodiment of the present invention.

FIGS. 5A-5F illustrate usage pattern recognition for an exemplary subscriber who, for example, has viewed hockey reports at 7:30 a.m. for the last two days. FIG. 5A illustrates an exemplary home page mobile device display 500 for services managed via service management software, in accordance with an embodiment of the present invention. In the example of FIG. 5A, five data services are displayed based on the usage patterns of the particular subscriber owning the mobile device. For example in FIG. 5A, the mobile device displays a ski service 502, a news service 504, a buddies service 506, a messaging service 508, and a calendaring service 510. As described in greater detail below, embodiments of the present invention store user profile information for individual subscribers. The data services 502-510 displayed in FIG. 5A are based on the user profile information of the subscriber owning the particular mobile device.

Figure 5B:
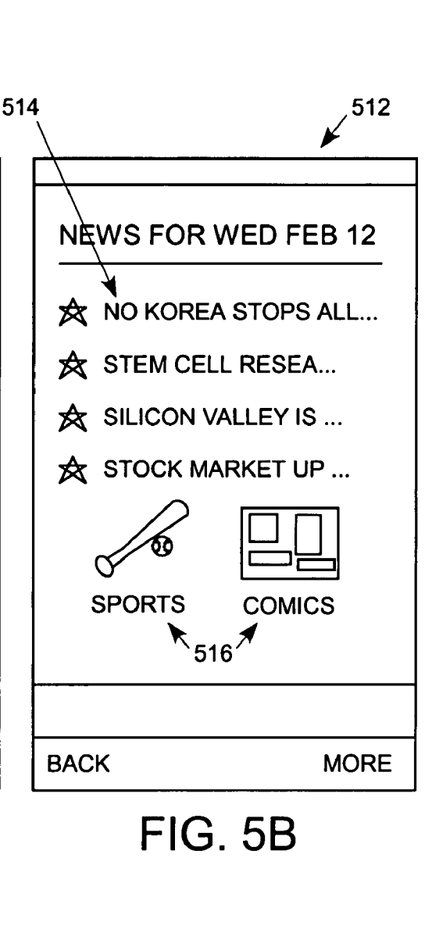
FIG. 5B illustrates an exemplary news data service display, in accordance with an embodiment of the present invention.

In the example of FIG. 5A the user decides to view the news by selecting the news data service 504. In response, the mobile device displays a news data screen illustrated in FIG. 5B. FIG. 5B illustrates an exemplary news data service display. The news service data displayed shows, for example, a date display 512, current headlines 514, and a plurality of news sections 516. Continuing with the above example, the user selects the sports section 516. In response, the mobile device displays the sports section of the news data service as illustrated in FIG. 5C.

Figure 5C:
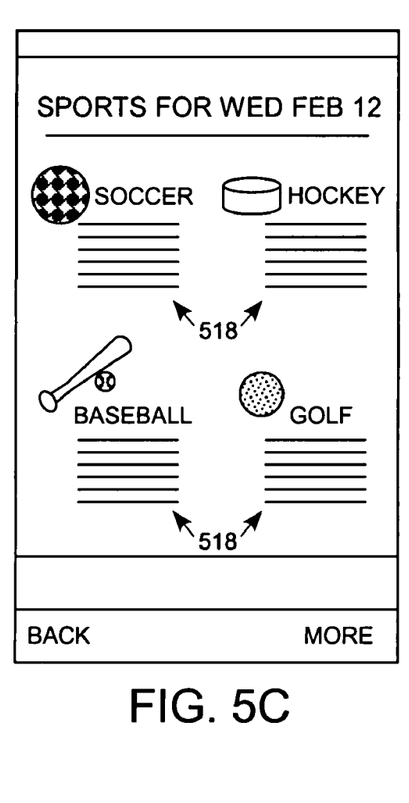
FIG. 5C illustrates an exemplary sports section of a news data service, in accordance with an embodiment of the present invention.
Figure 5D:
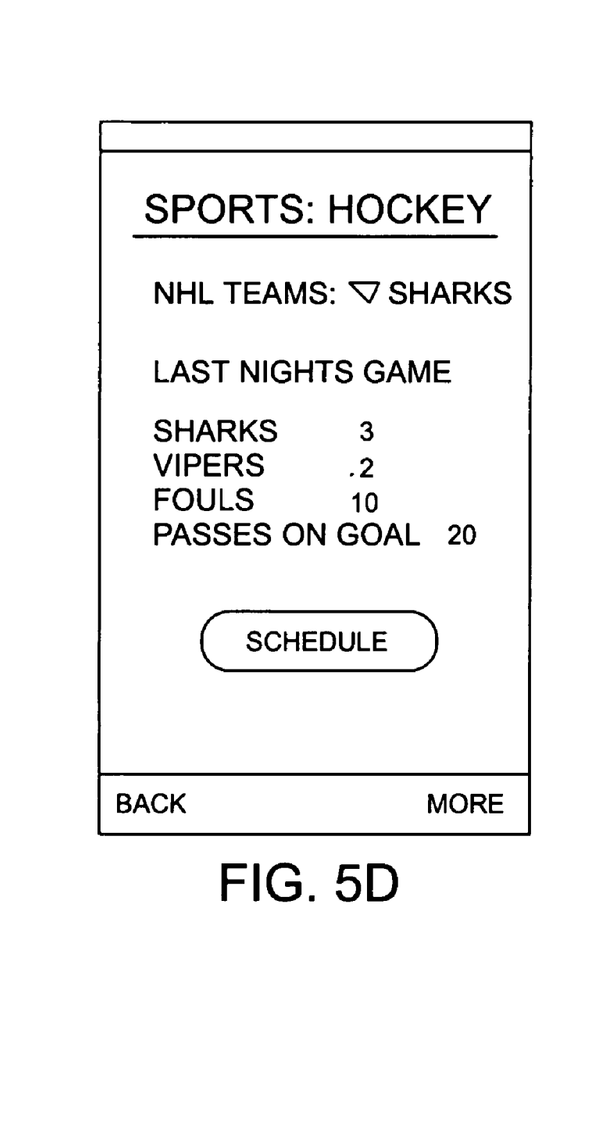
FIG. 5D illustrates exemplary game scores for an exemplary user's favorite hockey team, in accordance with an embodiment of the present invention.

FIG. 5C illustrates an exemplary sports section of a news data service in accordance with an embodiment of the present invention. For example, FIG. 5C illustrates a plurality of sports reports 518. Each sports report 518 provides information on a particular sport, such as, soccer, hockey, baseball, and golf. Continuing with the above example the user selects the hockey report 518 to obtain, for example, the recent hockey scores of their favorite team. As illustrated in FIG. 5D the game score for the user's favorite team is displayed for the user.

Figure 5E:
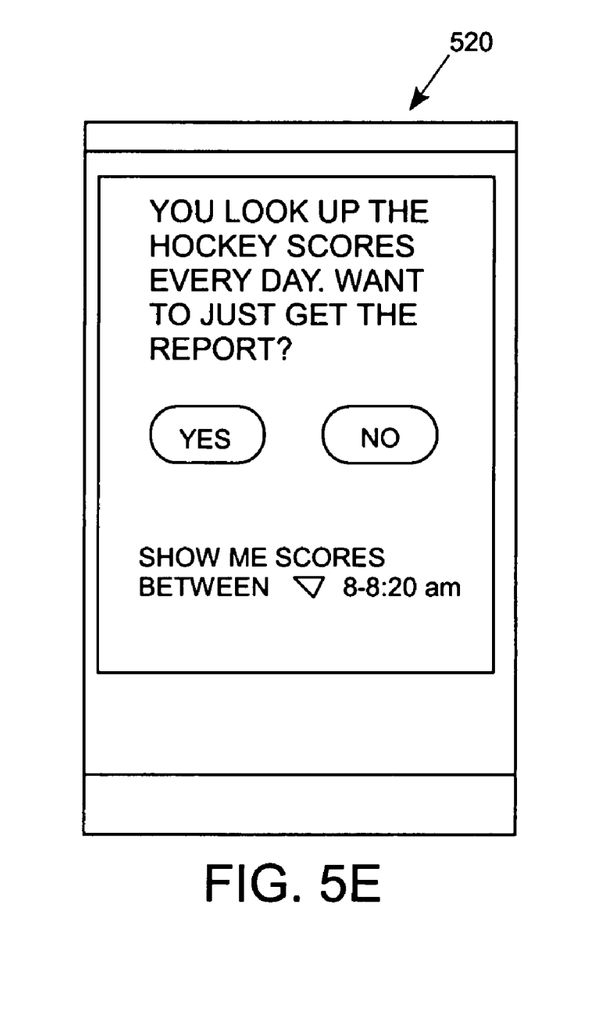
FIG. 5E illustrates an exemplary query display for a hockey data service, in accordance with an embodiment of the present invention.
Figure 5F:
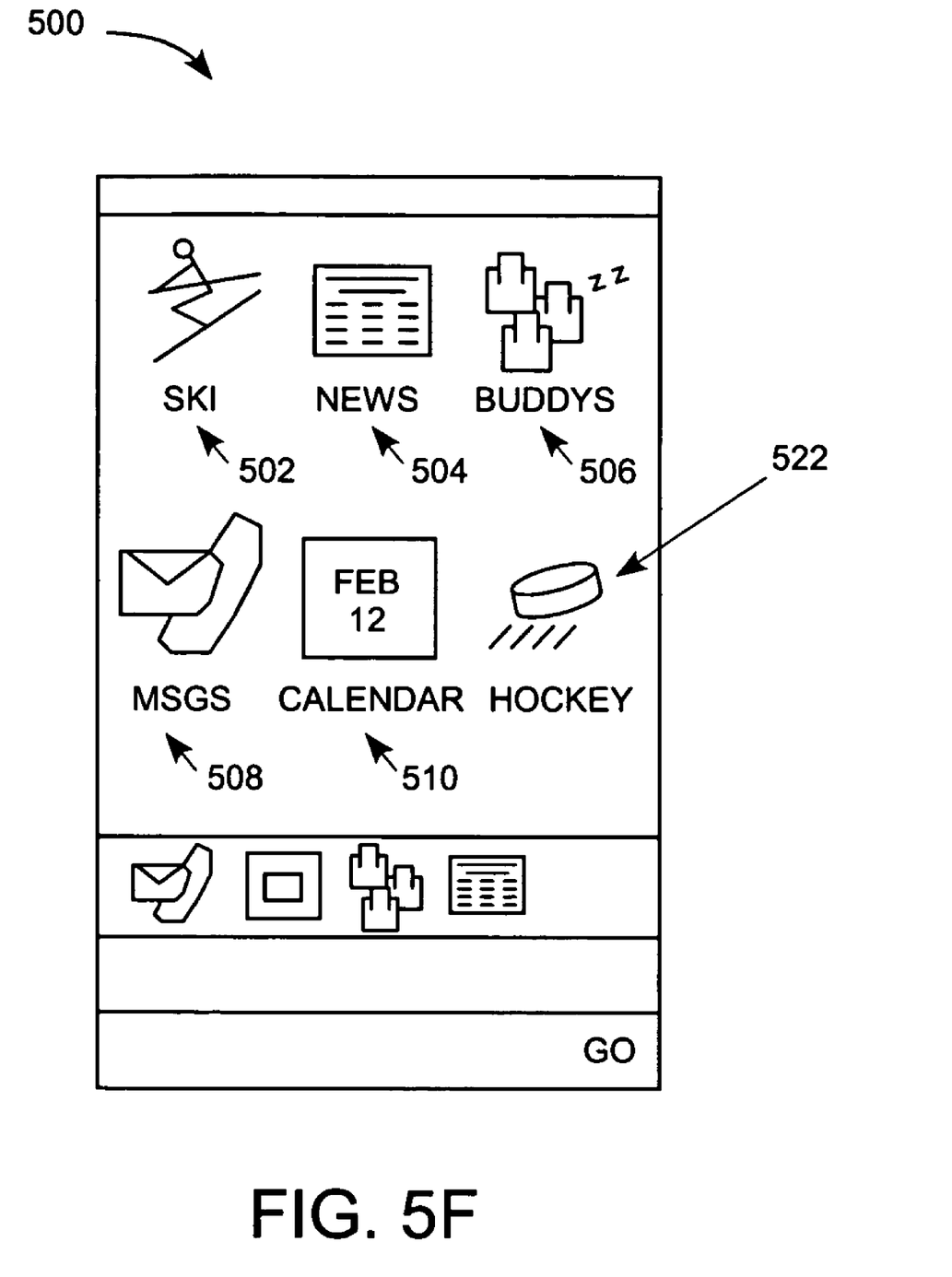
FIG. 5F illustrates an exemplary hockey icon added to a user's home page, in accordance with an embodiment of the present invention.

At this point the service management software of the embodiments of the present invention detects that this particular subscriber has viewed the hockey sports report 518 at about the same time three days in a row. The service management software detects this as a usage pattern that suggests a particular service. In response, the service management software displays a query display 520 as illustrated in FIG. 5E. FIG. 5E illustrates an exemplary query display 520 for a hockey data service in accordance with an embodiment of the present invention. The query display 520 queries the user as to whether the user would like to see the hockey report everyday at 7:30 a.m. Preferably, the query display 520 is displayed as if it were part of the Hockey screen or news service that Hockey screen is part of. That is, the query display 520 preferably appears to the user as a natural extension of what they were already doing, in this case, viewing the hockey report. Continuing with the above example the user confirms that they would like to view the hockey reports 518 on a daily basis. In response a hockey icon 522 is added to the user's home page mobile device display 500, as illustrated in FIG. 5F.

Figure 6A:
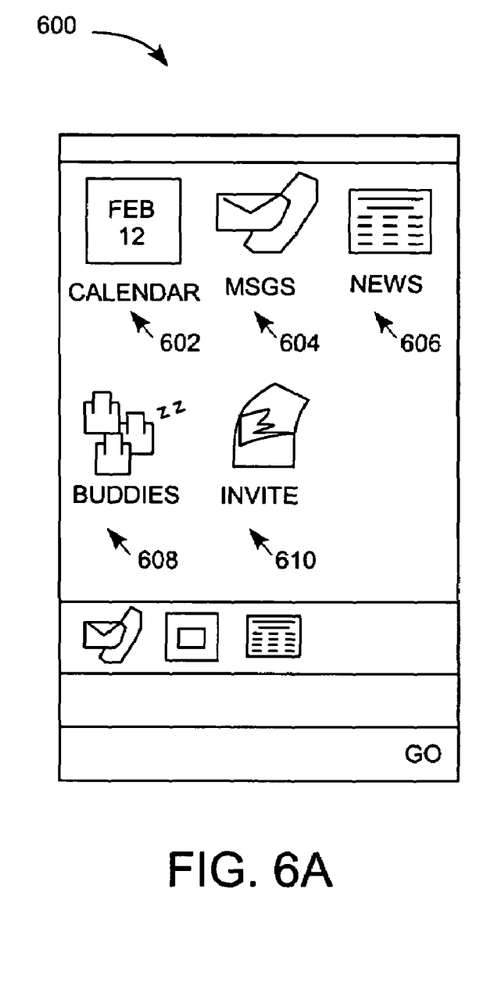
FIG. 6A illustrates an exemplary home page mobile device display for services managed via service management software, in accordance with an embodiment of the present invention.
Figure 6B:
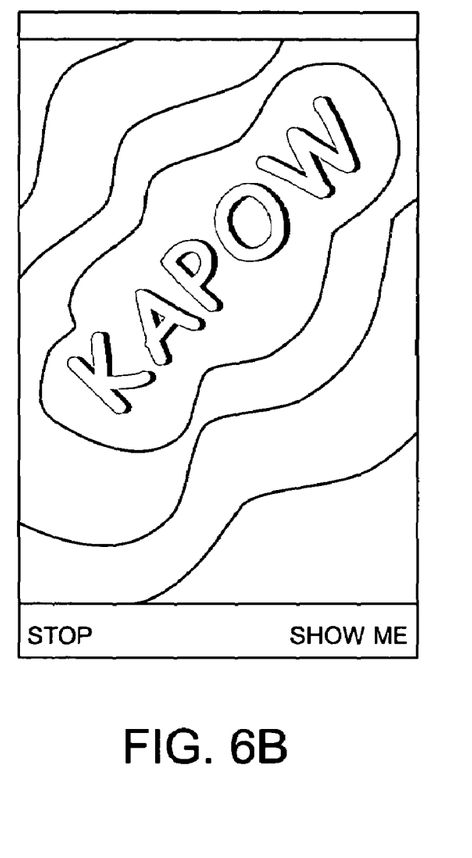
FIG. 6B illustrates an exemplary highly attention attracting display, in accordance with an embodiment of the present invention.
Figure 6C:
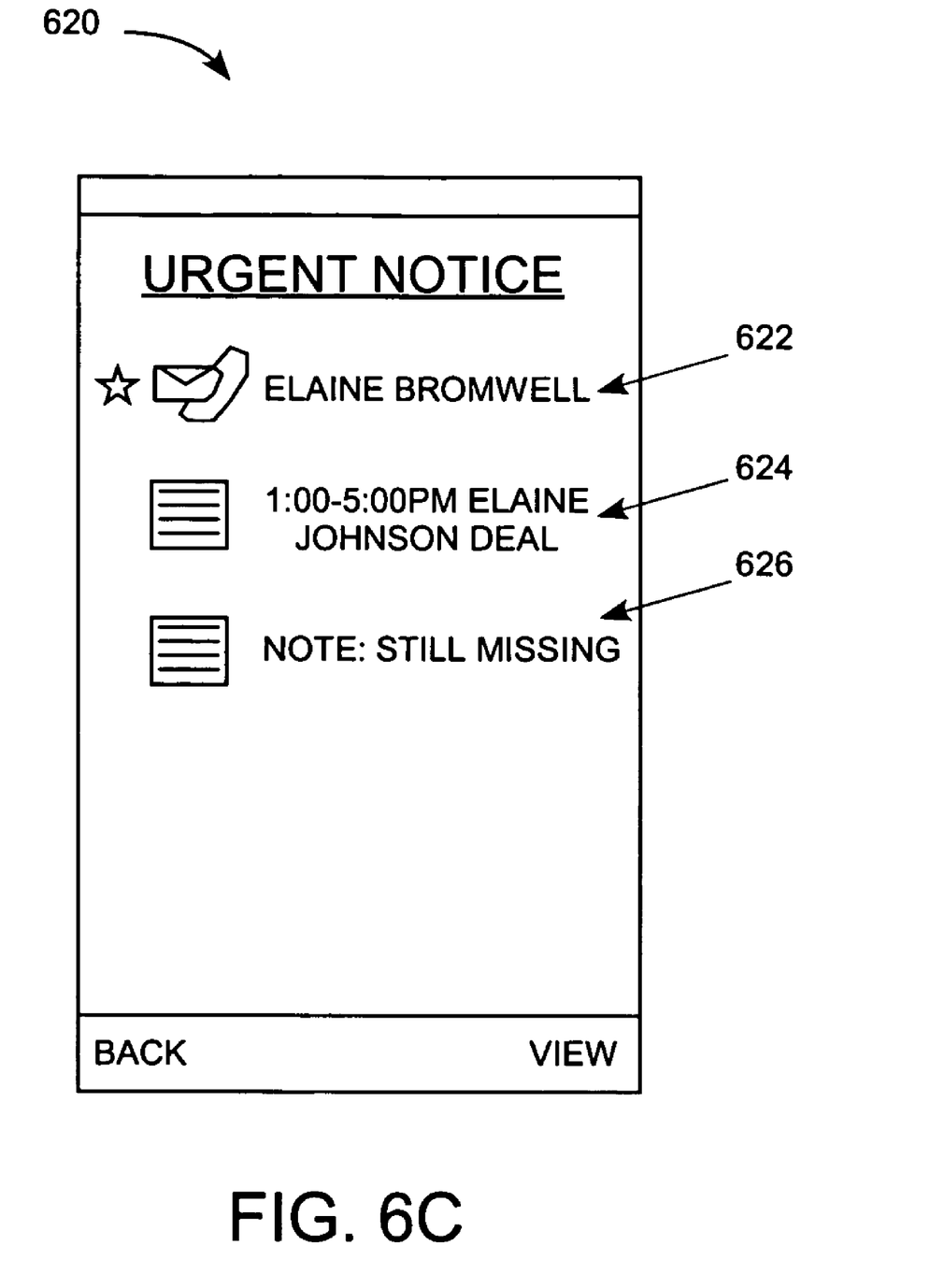
FIG. 6C illustrates an urgent notice display on a mobile device, in accordance with an embodiment of the present invention.

In addition to recognizing usage patterns, embodiments of the present invention can recognize the convergence of related information and notify the user of a possible important upcoming event. FIGS. 6A-6C illustrate information convergence recognition for an exemplary subscriber in accordance with an embodiment with the present invention. FIG. 6A illustrates an exemplary home page mobile device display 600 for services managed via service management software, in accordance with an embodiment of the present invention. In the example of FIG. 6A, five data services are displayed based on the usage patterns of the particular subscriber owning the mobile device. For example in FIG. 6A, the mobile device displays a calendaring service 602, a messaging service 604, a news service 606, a buddies service 608, and a movie invite service 610. The data services 602-610 displayed in FIG. 6A are based on the user profile information of the subscriber owning the particular mobile device.

In the example of FIGS. 6A-6C, the exemplary user is currently in a meeting with a client and as such has the ringer on their cellular phone turned off. Prior to the current meeting, the user entered information into their calendaring service 602 indicating that the user has a meeting with Elaine at 1:00 p.m. In addition, the user has attached a note to the appointment. Typically, a note provides additional information about the event to which it is attached. The user then receives a phone call, however because the ringer is off, the user is not instantly aware of the incoming call. Nevertheless, the user ID on the cellular phone identifies the incoming caller as Elaine.

At this point, the service management software of the embodiments of the present invention recognizes that the 1:00 p.m. appointment, the attached note, and the phone call all have Elaine as a common theme. In response, the service management software sends a notice to the user indicating an important event may be imminent. In the current example, because the user's phone is off, the service management software utilizes a highly attention attracting display, such as a colorful animated display as illustrated in FIG. 6B. In this manner, the user is made visually aware that a potential important event may be imminent.

Once the user sees the highly attention attracting display, the user can press a key on the phone to display an urgent notice screen. FIG. 6C illustrates an urgent notice display 620 on a mobile device, in accordance with an embodiment of the present invention. The urgent notice display 620 shows each piece of information the service management software utilized to detect the potential upcoming imminent event. For example, in FIG. 6C, the urgent notice display

620 shows the phone call from Elaine 622, the 1:00 p.m. appointment with Elaine 624 from the calendaring service 602, and the attached note 626. At this point, the user can select any of the displayed data to obtain further information. Additional information regarding advanced service interaction systems can be found in U.S. Provisional Patent Application No. 60/460,041, entitled "System and Method for Advanced Service Interaction," filed Apr. 2, 2003, which is incorporated herein by reference.

The invention may be practiced with other computer system configurations including hand-held devices, microprocessor systems, microprocessor-based or programmable consumer electronics, minicomputers, mainframe computers and the like. The invention may also be practiced in distributing computing environments where tasks are performed by remote processing devices that are linked through a network.

With the above embodiments in mind, it should be understood that the invention may employ various computer-implemented operations involving data stored in computer systems. These operations are those requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing.

Any of the operations described herein that form part of the invention are useful machine operations. The invention also relates to a device or an apparatus for performing these operations. The apparatus may be specially constructed for the required purposes, such as the cellular phone discussed above, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The invention can also be embodied as computer readable code on a computer readable medium. The computer readable medium is any data storage device that can store data, which can thereafter be read by a computer system. Examples of the computer readable medium include hard drives, network attached storage (NAS), read-only memory, random-access memory, CD-ROMs, CD-Rs, CD-RWs, magnetic tapes, and other optical and non-optical data storage devices. The computer readable medium can also be distributed over a network coupled computer systems so that the computer readable code is stored and executed in a distributed fashion.

Although the foregoing invention has been described in some detail for purposes of clarity of understanding, it will be apparent that certain changes and modifications may be practiced within the scope of the appended claims. Accordingly, the present embodiments are to be considered as illustrative and not restrictive, and the invention is not to be limited to the details given herein, but may be modified within the scope and equivalents of the appended claims.

What is claimed:

1. A method for providing context based information on a mobile device display, comprising the operations of:

tracking usage pattern data of a user based on interactions of the user with a plurality of services, the usage pattern data include a name of each of the plurality of services, a time of use of each of the plurality of services, a use frequency of each of the plurality of service;

associating the usage pattern data with user profile information of the user;

predicting a set of services from the plurality of services that the user is expected to utilize within a predefined period of time based on the user profile information, the user profile information including the usage pattern data;

displaying a service icon representing a service of the set of services most likely to be utilized in a primary position on the mobile device display;

displaying service icons representing remaining services in the set of services in secondary positions on the mobile device display; and displaying icons representing remaining services outside the set of services in a tertiary position of the mobile device display, wherein the service icons are animated to indicate additional information regarding corresponding services.

2. The method as recited in claim 1, wherein the tertiary position is within a tertiary tray that can be hidden during normal operation.

3. The method as recited in claim 1, further comprising the operation of presenting data utilizing a ticker tape display on the mobile device display.

4. The method as recited in claim 1, further comprising the operation of displaying informational icon labels for each service icon, each information icon label presenting specific information regarding a state of a corresponding service as it applies to a particular user.

5. The method as recited in claim 4, wherein each informational icon label changes when the state of the corresponding service changes.

6. The method as recited in claim 5, wherein each service icon is animated based on the state of the corresponding service as it applies to a particular user.

7. A context based mobile device display, comprising:

a primary service icon representing a service most likely to be utilized by a user within a predefined period of time based on user profile information, the primary service icon being displayed in a primary position on the mobile device display, the user profile information including usage pattern data, the usage pattern data being constructed from an analysis of previous interactions with the services by the user, wherein the analysis includes tracking usage pattern data of a user based on interactions of the user with a plurality of services, the usage pattern data include a name of each of the plurality of services, a time of use of each of the plurality of services, a use frequency of each of the plurality of service;

a plurality of secondary service icons representing services likely to be utilized by a user within a predefined period of time based on user profile information, the secondary service icons being smaller than the service icon representing the service in the primary position; and a plurality of tertiary service icons representing remaining services available to the user, the tertiary service icons being displayed in a tertiary position of the mobile device display.

8. The system as recited in claim 7, wherein the tertiary positions are within a tertiary tray that can be hidden during normal operation.

9. The system as recited in claim 7, further comprising a ticker tape display that presents data in a scrolling manner on the mobile device display.

10. The system as recited in claim 7, wherein each primary service icon and secondary service icon is labeled utilizing informational icon labels, each information icon label presenting specific information regarding a state of a corresponding service as it applies to the user.

11. The system as recited in claim 10, wherein each informational icon label changes when the state of the corresponding service changes.

12. The system as recited in claim 11, wherein each service icon is animated based on the state of the corresponding service as it applies to the user.

13. A computer program embodied on a computer readable medium, the computer program capable of providing context based information on a mobile device display, comprising:

program instructions to track usage pattern data of a user based on interactions of the user with a plurality of services, the usage pattern data include a name of each of the plurality of services, a time of use of each of the plurality of services, a use frequency of each of the plurality of service;

program instructions to associate the usage patter data with user profile information of the user;

program instructions that predict a set of services from the plurality of services that the user is expected to utilize within a predefined period of time based on the user profile information, the user profile information including the usage pattern data;

program instructions that display a service icon representing a service of the set of services most likely to be utilized in a primary position on the mobile device display;

program instructions that display service icons representing remaining services in the set of services in secondary positions on the mobile device display, the service icons representing remaining services in the secondary positions being smaller than the service icon representing the service in the primary position; and program instructions that display icons representing remaining services outside the set of services in a tertiary position of the mobile device display, wherein the service icons are animated to indicate additional information regarding corresponding services.

14. The computer program as recited in claim 13, wherein the tertiary position is within a tertiary tray that can be hidden during normal operation.

15. The computer program as recited in claim 13, further comprising program instructions that present data utilizing a ticker tape display on the mobile device display.

16. The computer program as recited in claim 13, further comprising program instructions that display informational icon labels for each service icon, each information icon label presenting specific information regarding a state of a corresponding service as it applies to a particular user.

17. The computer program as recited in claim 16, wherein each informational icon label changes when the state of the corresponding service changes.

18. The computer program as recited in claim 17, wherein each service icon is animated based on the state of the corresponding service as it applies to a particular user.

* * * * *